(12) United States Patent
Kritt et al.

(10) Patent No.: US 7,194,323 B2
(45) Date of Patent: Mar. 20, 2007

(54) METHOD AND SYSTEM FOR OBJECT ORIENTED APPROACH AND DATA MODEL FOR CONFIGURE-TO-ORDER MANUFACTURING SYSTEM

(75) Inventors: Barry Alan Kritt, Creedmoor, NC (US); Douglas A. Law, Chapel Hill, NC (US); James Keith MacKenzie, Ayrshire (GB); Pamela Annette Morse, Durham, NC (US); Shawn Konrad Sremaniak, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1199 days.

(21) Appl. No.: 09/814,524

(22) Filed: Mar. 22, 2001

(65) Prior Publication Data
US 2002/0188514 A1   Dec. 12, 2002

(51) Int. Cl.
*G06F 19/00*   (2006.01)
(52) U.S. Cl. .................................. 700/97; 706/904
(58) Field of Classification Search ............ 707/103 R, 707/103 Y, 103 X, 103 Z; 709/315, 332; 717/107, 108, 116; 700/97, 103; 706/904, 706/912
See application file for complete search history.

(56) References Cited

U.S. PATENT DOCUMENTS

| | | | | |
|---|---|---|---|---|
| 5,463,555 A | * | 10/1995 | Ward et al. | 700/96 |
| 5,548,756 A | * | 8/1996 | Tantry et al. | 707/10 |
| 5,576,965 A | * | 11/1996 | Akasaka et al. | 700/97 |
| 5,751,941 A | | 5/1998 | Hinds et al. | |
| 5,995,757 A | * | 11/1999 | Amberg et al. | 717/175 |
| 6,543,047 B1 | * | 4/2003 | Vrhel et al. | 717/121 |
| 2001/0027483 A1 | * | 10/2001 | Gupta et al. | 709/219 |
| 2002/0120521 A1 | * | 8/2002 | Forth et al. | 705/26 |

OTHER PUBLICATIONS

"Module-based Intelligent Advisory System," Jyri Papstel, *International Journal of Production Economics*, vols. 60-61, 1999, pp. 195-201.

"A Tool for Developing Interactive Configuration Applications," Tomas Axling and Seif Haridi, *Swedish Institute of Computer Science*, Mar. 8, 1994, pp. 27-45.

* cited by examiner

*Primary Examiner*—Albert W. Paladini
(74) *Attorney, Agent, or Firm*—Sawyer Law Group, LLP; Joscelyn E. Cockburn

(57) ABSTRACT

A method and system for product fulfillment in an automated manufacturing system is disclosed. The method and system of the present invention includes obtaining requirements for a product from a customer. The method and system further includes creating a plan from the requirements using a descriptive language. The plan is then conveyed to an automated manufacturing system for use in manufacturing the product.

59 Claims, 2 Drawing Sheets

METHOD AND SYSTEM FOR OBJECT ORIENTED APPROACH AND DATA MODEL FOR CONFIGURE-TO-ORDER MANUFACTURING SYSTEM

FIELD OF THE INVENTION

The present invention relates to automated product fulfillment and in particular, an object oriented approach and data model for configure-to-order computer manufacturing systems.

BACKGROUND OF THE INVENTION

The computer manufacturing industry has undergone several major changes in recent years. One of these major changes has been in the area of customized or personalized computer systems. Today, consumers essentially can build their own systems based on their unique requirements. For example, a customer can select hardware components (e.g., types and quantities of memory, DASD, CPU, PCI option cards, etc.), and the placement of the hardware within the system (e.g., which slots, bays, and riser cards the devices are installed in and how they are cabled). Moreover, the customer can select software (e.g., operating systems, applications, and device drivers), system settings (e.g., boot sequence, RAID configuration, and operating system and network settings such as computer name, IP addresses, subnet masks, etc.), and other services (e.g., placement of asset tags on exterior of machines, saving and printing information unique to the machine). Thus, the customer can build a configure-to-order system that meets the customer's exact specifications and requirements.

Providers of configure-to-order fulfillment systems face numerous challenges. First, given the variety of hardware components, software, settings, and services available in a computer system from which the customer might choose, the configure-to-order system must be able to handle the various permutations created by the customer. Because of the enormity of this task, current configure-to-order systems do not afford the customer full control over customization. Rather, a "machine type model" approach is taken, wherein a grouping of components is represented by a part number or model name. For instance, a particular part number might signify a specific CPU with memory loaded in a particular slot. The manufacturing system understands the meaning of the part number and builds the corresponding product. In this approach, the customer is allowed a limited range of predetermined choices, such as processor type, memory, and perhaps exterior color. Accordingly, while the number of combinations is manageable for the provider, customer flexibility is sacrificed.

In the alternative, custom preferences can be communicated to a customer service provider who then records or enters the information on an order form (text based), which is then used during the post ordering process. This system, however, is inefficient because the information on the order form might be inaccurate or incomplete, or both, thereby causing delays in manufacturing while the customer is contacted for more information. In addition, the information on the order form must be retyped or otherwise recreated for use in other processes besides assembly, such as testing and software preload. Moreover, if the assembly process is manual, an assembly worker can misinterpret the information on the order form.

Thus, current configure-to-order manufacturing systems either lack the versatility to allow a customer to have full control of the ordering process, or are inefficient in their operations, requiring extensive customer contact after the initial order time. What is needed is a configure-to-order manufacturing system and process which allows the customer flexibility at the initial order time so the customer can choose all of the configuration and personalization options for the product. The system and process should automatically capture this information and create a product plan that meets all of the development rules for the product and installed options and software for correct operation. Moreover, the product plan should describe to the assembly worker what steps must occur to build the product, preferably in a simple picture based manner, describe to the automated test system the configuration of the machine for verification purposes, i.e., to validate the worker correctly assembled the machine and that the parts are functioning correctly, and describe to the automated preload system the software and personalization that must occur. Finally, the product plan should provide information that can be used by service and support for repairs or maintenance. The present invention addresses such a need.

SUMMARY OF THE INVENTION

A method and system for product fulfillment in an automated manufacturing system is disclosed. The method and system of the present invention includes obtaining requirements for a product from a customer. The method and system further includes creating a plan from the requirements using a descriptive language. The plan is then conveyed to an automated manufacturing system for use in manufacturing the product.

An object oriented approach and data model of the present invention allows customization and personalized information to be captured completely and accurately at the initial order time such that follow-up calls to the customer are eliminated or greatly reduced. Moreover, the present invention provides an end-to-end automated process which enables a manufacturer to build the customized product in a high-quality, cost-effective and repeatable manner.

DETAILED DESCRIPTION

Figure 1:
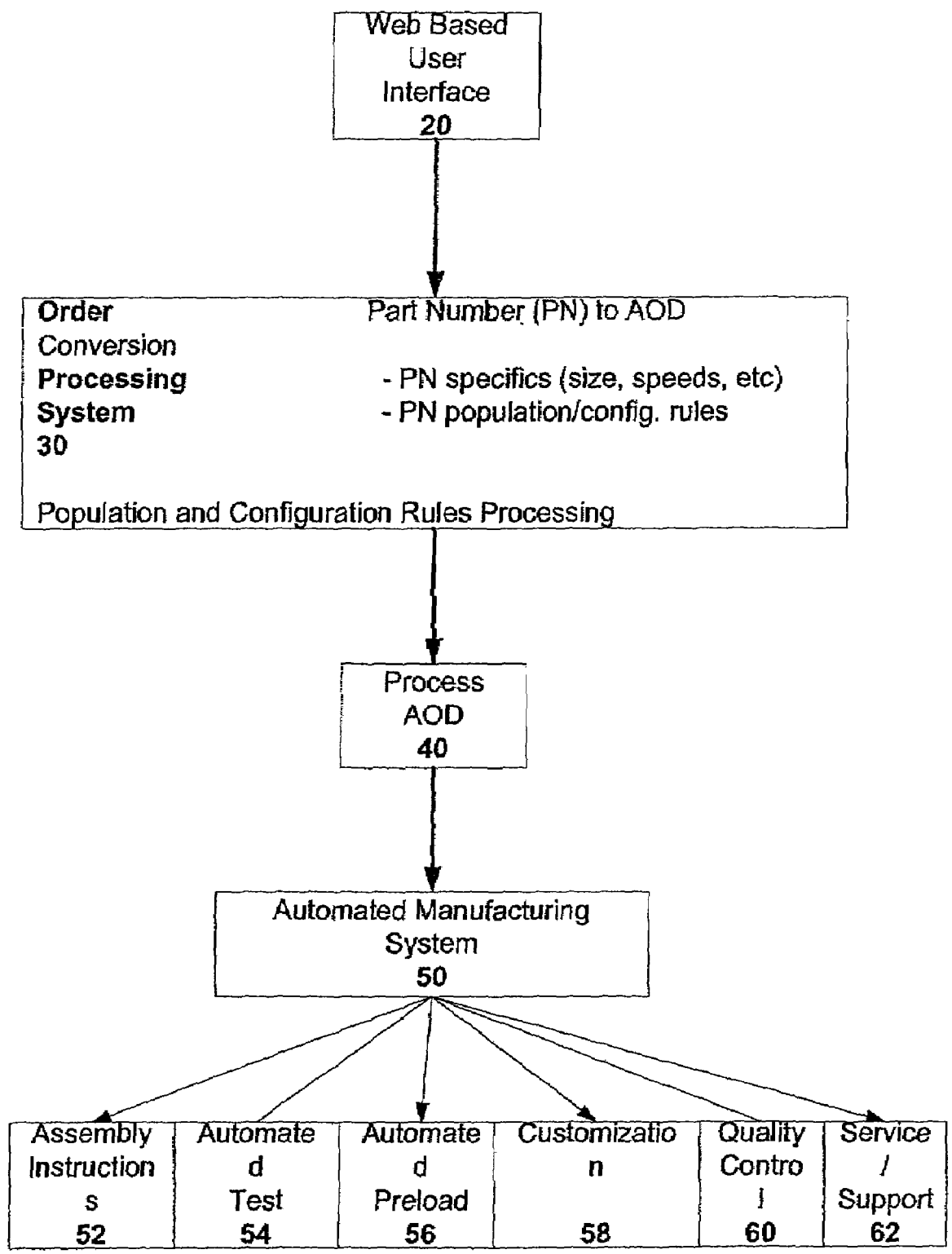
FIG. 1 illustrates a block diagram representing a product fulfillment system in accordance with one embodiment of the present invention.

The present invention relates to automated product fulfillment and in particular, to an object oriented approach and data model for configure-to-order product manufacturing systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The object oriented approach and data model of the present invention provides the means for capturing customized order information in a clear, non-ambiguous, structured, and extensible manner, and for manufacturing the product in a high-quality, cost-effective, and repeatable manner. Although the following discussion is directed primarily to configure-to-order computer systems, it is important to note that the present invention can be implemented for products other than computers. Thus, the present invention is in no way limited to computer or information processing products.

The object oriented approach and data model of the present invention addresses the problems associated with configure-to-order manufacturing systems discussed above. By using a descriptive language referred to as Architected Object Data ("AOD") to describe the custom ordered product, the manufacturing process from start-to-finish can "speak" the same language. The present invention merges customer requirements, population rules (e.g., sequences for fining CPU, memory, expansion card, DASD slots, etc.) and configuration rules (e.g., setting jumpers, changing CMOS setup values, etc.) into an accurate and comprehensive product plan that can be passed onto, and used by, an automated manufacturing system.

As will be described in detail below, AOD is a descriptive language that can be used as a data model for personal computers or other systems. The product plan, also known as a process AOD, describes fully every aspect of the product, from the hardware components to the types of connections between devices. Each process downstream from the ordering process understands AOD and uses the product plan to perform its function, whether it be automated testing, software loading, or assembly.

AOD is hierarchical and object oriented in nature. The following is a description of the AOD data model.

AOD Object Hierarchy

The AOD format provides a hierarchical structure used to describe a product, such as a personal computer. For example, Table 1 illustrates an example of a partial object hierarchy in AOD for a simple personal computer.

TABLE 1

| Level | Object |
|-------|--------|
| 001 | +–UNIT(1) |
| 002 | +–CHASSIS(1) |
| 003 | +–PICTURE (1) |
| 004 | +–SCHEMATIC(1) |
| 005 | +–BAYPLANAR (1) |
| 006 | +–PLANAR (1) |

The "UNIT" object is at the top of the hierarchy, with first level child objects under it. The first level child objects can then in turn be parents to additional levels of child objects. Thus, CHASSIS (1) is a first level child object, and PICTURE (1) is a child of CHASSIS (1). SCHEMATIC (1) and BAYPLANAR (1) are also children of CHASSIS (1), and PLANAR (1) is a child of BAYPLANAR (1).

Because of the modular nature of AOD, new objects can easily be added to the system when new products or components become available. Thus, the customer's choices are continually being updated and optimized.

General AOD Syntax

AOD uses the following general syntax:
Object(Instance).Attribute=Value

Object

An object in AOD is a model or data template of a component. This template will have attributes that relate to that component (physical or logical). An object or group of objects is chosen to describe each physical part and each logical part. A planar, chassis, PCI cards, memory, and processor are typical physical parts, while software images and partitioning information are logical parts. Thus, for example, an object called "PCI" will be used to represent each PCI device in the unit to be built, and an object called "PLANAR" will be used to represent each planar in the unit.

Instance

The instance of an object is an occurrence of an object. This can also be thought of as a specific usage of an object template. The instance number is a positive whole number starting at 1. It is used to differentiate between multiple occurrences of the same object type. Thus, for example, two different PCI objects will be represented by PCI(1) and PCI(2).

Attribute

An attribute is a characteristic that is associated with an object. For example, attributes associated with a PCI object might be the PCI's vendor identification and device identification, and whether the PCI is an onboard (soldered) device or an option card.

Value

Each attribute is assigned a value, which is designated by the specific attribute. Thus, the value of an attribute might be a string of text, a number, a comma separated list of numbers or words, as defined by the specific attribute. For example, where an attribute associated with a CPU object might be speed, the value for the speed attribute can be 667_MHz.

In Table 2, AOD for a CPU device is provided in column 1, and explanative comment is provided in column 2.

TABLE 2

| AOD | Comment |
|-----|---------|
| CPU(1).Desc=Intel P3 | Description of the object |
| CPU(1).BOM_PN=209N9215 | Part number of the object |
| CPU(1).TestClass=cpu | Indicates type of test that will be done in manufacturing |
| CPU(1).Speed=667_MHZ | CPU speed information for automated software verify |
| CPU(1).BusSpeed=133_MHZ | CPU bus speed information |
| CPU(1).L1Cache=32_KB | CPU L1 cache information |
| CPU(1).L2Cache=256_KB | CPU L2 cache information |
| CPU(1).SmbiosType=11 | CPU SMBIOS Information |
| CPU(1).SmbiosDesignation=CPU1 | CPU SMBIOS Information |

AOD Syntax for Linking Parent and Child Objects

Because AOD is a hierarchical language, it is important to be able to link child objects to their parents using AOD syntax. This is done using the general AOD format, but with a more specific usage of the syntax:
ParentObject(Instance).ChildObject( )=Value ParentObject (Instance)

A ParentObject is the object that is being defined to be hierarchically above a ChildObject. The instance is defined above and identifies the parent object specifically.

Child Object( )

The ChildObject is the object that is being defined as being hierarchically below, or owned by the ParentObject. As defined above in the general syntax, the ChildObject occupies the position held by the attribute associated with the ParentObject. The ( ) immediately following the ChildObject is the specific indicator that indicates the attribute is referring to a child object, and that this AOD is lining a parent and child object.

Value

The value in the Parent/Child AOD syntax is a number or range of numbers that indicate which instances of ChildObjects should be linked to the ParentObject.

Table 3 illustrates a sample of AOD for two Parent/Child links.

TABLE 3

PLANAR (1).PCI( ) = 1
PLANAR (1).ConnectorMem ( ) = 1:2

In the example in Table 3, PLANAR (1) is the parent of PCI (1) object. The second link indicates that PLANAR (1) is the parent of ConnectorMem (1) and ConnectorMem (2).

AOD Syntax for Describing Device Connections

It is essential to populate devices such as memory, DASD, CPUs, and option cards, using the correct connectors/cables. Thus, there should be and is a way to model proper connection information in AOD. This is done again using the general AOD format, but with a more specific usage of the syntax:

ReceivingObject(Instance)
 .InstalledDevice=InstalledObject(Instance)
and
ReceivingObject(Instance)
 .LocatedDevice=InstalledObject(Instance)

ReceivingObject(Instance)

The ReceivingObject is the object which will receive an installed or located device. The instance number specifies which occurrence of the ReceivingObject is being referenced.

"InstalledDevice" and "LocatedDevice"

The text strings "InstalledDevice" or "LocatedDevice" are specific attributes indicating that the AOD is describing a device connection and the nature of that connection. InstalledDevice signifies an electrical connection between devices. Typically, devices are electrically connected by cables or connecting members. LocatedDevice indicates that the ReceivingObject and InstalledObject are mechanically or physically connected. So, for instance, LocatedDevice is used to indicate into which bay a DASD device or power supply is physically mounted, and InstalledDevice can indicate into which PCI slot a card will be inserted.

InstalledObject(Instance)

The InstalledObject is the device which is being installed onto the ReceivingObject device. The instance number specifies which occurrence of an installed object is being referenced.

Table 4 is a sample of AOD illustrating device connections.

TABLE 4

ConnectorMem (1 ).InstalledDevice = Mem(1)
ConnectorMem (2).InstalledDevice = EMPTY
BayPower(1).LocatedDevice=Power(1)
BayHdd(1).LocatedDevice = Ide(2)

The AOD in Table 4 indicates that ConnectorMem(1) has Mem(1) electrically connected to it, whereas ConnectorMem(2) is empty. ConnectorMem can be a connecting member attached to a device or component. For example, a planar might have several connecting members into which other devices can be installed. Thus, an electrical connection is established between the planar and the device via the connecting member.

Referring back to Table 4, Power(1) power supply is physically mounted in BayPower (1). The AOD indicates where the power supply is located. DASD Ide(2) is physically mounted in BayHdd(1).

Given these general syntax rules for AOD, a product, such as a personal computer, can be fully and accurately described in a structured and non-ambiguous manner. Table 5 illustrates a complete AOD product plan for a single personal computer with explanatory comments in parenthesis.

TABLE 5

| AOD For ORDER_ID [000100066023] | |
|---|---|
| * | |
| UNIT(1).MTM=6565CTO | (Machine type and model) |
| UMT(1).BOM_PN=19K5277 | (Part number for the object) |
| UNIT(1).CHASSIS( )=1 | (Indicates there is 1 chassis child object) |
| UNIT(1).DTAImage( )=1 | (Indicates there is 1 preload image) |
| UNIT(1).RFIDSUPPORTED=YES | (Indicates system support rfid functionality) |
| CHASSIS(1).PICTURE( )=1 | (Indicates there is 1 picture child for chassis) |
| PICTURE(1).DESC=ATHENA Chassis | (Description of the picture) |
| PICTURE(1).FILE=ATHCHAS.jpg | (File name of the picture (MEG assembly aid)) |
| CHASSIS(1).SCHEMATIC( )=1 | (Indicates there is 1 chassis drawing) |
| SCHEMATIC(1).DESC=ATHENA Chassis | (Description of the chassis drawing) |
| SCHEMATIC(1).FILE=ATHENA1.jpg | (File name of the drawing (MEG assembly aid)) |
| CHASSIS(1).BAYPLANAR( )=1 | (Indicates their is one bay to put a planar) |
| CHASSIS(1).BAYPOWER( )=1 | (Indicates their is one bay to put a power supply) |
| BAYPOWER(1).LOCATORTEXT= POWER1 | (Text to tell operator how to identify power bay) |
| BAYPOWER(1).SCHEMATICOFFSET= | (Coordinates of power bay on the |

TABLE 5-continued

| | |
|---|---|
| 10,10,30,30 | |
| CHASSIS(1).BAYFDD( )=1 | (Indicates there is one bay to put a floppy drive) |
| | |
| BAYFDD(1).LOCATORTEXT= FLOPPY DRIVE | (Text to tell operator how to identify floppy bay) |
| BAYFDD(1).SCHEMATICOFFSET=35,40,50,55 | |
| CHASSIS(1).BAYHDD( )=1 | |
| BAYHDD(1).LOCATORTEXT=HDD BAY1 | |
| BAYHDD(1).SCHEMATICOFFSET=EMPTY | |
| CABLEFDD(1).DESC=FDD CABLE | |
| CABLEFDD(1).OPERATION=KITTING | (Indicates MFG operation that will add part) |
| CABLEFDD(1).BOM_PN=19K5277 | |
| CABLEFDD(1).SCHEMATIC( )=1 | |
| CABLEFDD(1).PICTURE( )=1 | |
| CABLEFDD(1).CONNECTORFDD( )=1 | |
| CONNECTORFDD(1).FDDTYPE=FDD1 | |
| CONNECTORFDD(1).LOCATORTEXT=FDD 1 | |
| CONNECTORFDD(1).DriveName=ADRIVE | |
| CONNECTORFDD(1).SCHEMATICOFFSET=EMPTY | |
| CHASSIS(1).BAYDASD1( )=1 | |
| BAYDASD1(1).LOCATORTEXT=DASD BAY1 | |
| BAYDASD1(1).SCHEMATICOFFSET=EMPTY | |
| CHASSIS(1).BAYDASD2( )=1 | |
| BAYDASD2(1).LOCATORTEXT=DASD BAY2 | |
| BAYDASD2(1).SCHEMATICOFFSET=EMPTY | |
| BAYPLANAR(1).LOCATORTEXT=PLANAR | |
| BAYPLANAR(1).SCHEMATICOFFSET=EMPTY | |
| PLANAR(1).DESC=ATHENA PLANAR | |
| PLANAR(1).OPERATION=KITTING | |
| PLANAR(1).BOM_PN=61H2571 | |
| PLANAR(1).TESTCLASS=athenaplanar | (Indicate tests that are associated with this Object) |
| PLANAR(1).CONNECTORCPU( )=1 | (Indicates there is 1 CPU connector) |
| CONNECTORCPU(1).LOCATORTEXT=CPU 1 | |
| CONNECTORCPU(1).SMBIOSDESIGNATION=CPU | (Information on the CPU connector (for SW verify)) |
| | |
| CONNECTORCPU(1).SCHEMATICOFFSET=EMPTY | |
| PLANAR(1).CONNECTORMEM( )=1:2 | (Indicates there are 2 memory connectors) |
| CONNECTORMEM(1).LOCATORTEXT=MEM 1 | |
| CONNECTORMEM(1).SMBIOSDESIGNATION=DIMM 0 | (Information on first memory connector (for SW verify)) |
| | |
| CONNECTORMEM(1).SCHEMATICOFFSET=EMPTY | |
| CONNECTORMEM(2).LOCATORTEXT=MEM 2 | |
| CONNECTORMEM(2).SMBIOSDESIGNATION=DIMM 1 | (Information on the second memory connector) |
| | |
| CONNECTORMEM(2).SCHEMATICOFFSET=EMPTY | |
| PLANAR(1).PCI( )=1 | (Indicates there is one PCI object on planar) |
| PCI(1).DESC=ESSAUDIOALLEGRO | (Information on type of PCI device) |
| PCI(1).PCIADDRESS=BUS[00]DEV[12]FUNC[O] | (Information on address of PCI device) |
| PCI(1).OPERATION=KITTNG | |
| PCI(1).BOM_PN=61H2571 | |
| PCI(1).TESTCLASS=essaudio | |
| PCI(1).ONBOARD=YES | (Indicates PCI is attached to planar (i.e., not a card)) |
| PCI(1).VENDORID=125D | (Vendor ID for the PCI device (for SW verify)) |
| PCI(1).DEVICEID=1988 | (Device ID for the PCI device (for SW verify)) |
| PLANAR(1).CONNECTORAGP( )=1 | |
| CONNECTORAGP(1).LOCATORTEXT=AGP 1 | |
| CONNECTORAGP(1).SMBIOSDESIGNATION=AGP | |
| CONNECTORAGP(1).SMBIOSNAME=PCI | |
| CONNECTORAGP(1).PCIADDRESS=BUS[01]DEV[00]FUNC[0] | |
| CONNECTORAGP(1).SCHEMATICOFFSET=EMPTY | |
| PLANAR(1).CONNECTORPCI( )=1:3 | (Indicates there are 3 pci connectors on this planar) |
| CONNECTORPCI(1).LOCATORTEXT=PCI 1 | |
| CONNECTORPCI(1).SMBIOSDESIGNATION1=1-PCI | (Information on first pci connector (for SW verify)) |
| | |
| CONNECTORPCI(1).SMBIOSNAME=PCI | |
| CONNECTORPCI(1).PCIADDRESS=BUS[00]DEV[10]FUNC[0] | |
| CONNECTORPCI(1).SCHEMATICOFFSET=EMPTY | |
| CONNECTORPCI(2).LOCATORTEXT=PCI 2 | |
| CONNECTORPCI(2).SMBIOSDESIGNATION=2-PCI | |
| CONNECTORPCI(2).SMBIOSNAME=PCI | |
| CONNECTORPCI(2).PCIADDRESS=BUS[00]DEV[0F]FUNC[0] | |
| CONNECTORPCI(2).SCHEMATICOFFSET=EMPTY | |
| CONNECTORPCI(3).LOCATORTEXT=PCI 3 | |
| CONNECTORPCI(3).SMBIOSDESIGNATION=3-PCI | |
| CONNECTORPCI(3).SMBIOSNAME=PCI | |
| CONNECTORPCI(3).PCIADRESS=BUS[00]DEV[0E]FUNC[0] | |
| CONNECTORPCI(3).SCHEMATICOFFSET=EMPTY | |
| PLANAR(1).CONNECTORCABLEIDE( )=1:2 | |

TABLE 5-continued

```
CONNECTORCABLEIDE(1).LOCATORTEXT=PRIMARY IDE CONTROLLER
CONNECTORCABLEIDE(1).CONTROLLER=PRIMARY
CONNECTORCABLEIDE(1).SCHEMATICOFFSET=EMPTY
CONNECTORCABLEIDE(2).LOCATORTEXT=SECONDARY IDE CONTROLLER
CONNECTORCABLEIDE(2).CONTROLLER=SECONDARY
CONNECTORCABLEIDE(2).SCHEMATICOFFSET=EMPTY
PLANAR(1).CONNECTORCABLEFDD( )=1
CONNECTORCABLEFDD(1).LOCATORTEXT=FDD CONTROLLER
CONNECTORCABLEFDD(1).SCHEMATICOFFSET=EMPTY
PLANAR(1).CONNECTORPOWER( )=1
CONNECTORPOWER(1).LOCATORTEXT=POWER INPUT
CONNECTORPOWER(1).SCHEMATICOFFSET=EMPTY
PLANAR(1).SCHEMATIC( )=2
SCHEMATIC(2).DESC=ATHENA Planar
SCHEMATIC(2).FILE=ATHPLNR.JPG
PLANAR(1).PICTURE( )=2
PICTURE(2).DESC=ATHENA Planar
PICTURE(2).FILE=ATHPLNR.jpg
PLANAR(1).SETTTNGS( )=1:2
SETTINGS(1).APMBIOS=ENABLE                              (Indicates CMOS setting requested)
SETTINGS(1).ALT_BOOTSEQUENCE=ENABLE
SETTINGS(1).RESET_POC=ENABLE
SETTINGS(1).RUNIN=HALF_HR                               (Indicates desired test time)
IDE(1).DESC=48X CDROM
IDE(1).OPERATION=KITT1NG
IDE(1).BOM_PN=09N0734
IDE(1).TESTCLASS=cdrom_aud
IDE(1).CAPACITY=48X
IDE(1).IDETYPE=CDROM
DTAImage(1).DTA_FILE=BP113US.DTA                        (Name of file specifying preload content)
DTAImage(1).TestClass=pdrvimg                           (Indicates process that will be used to preload)
CPU(1).DESC=INTEL P3
CPU(1).OPERATION=CPL-KIT
CPU(1).BOM_PN=09N9215
CPU(1).TESTCLASS=cpu
CPU(1).SPEED=667_MHZ                                    (CPU information (for SW verify))
CPU(1).BUSSPEED=133_MHZ                                 (CPU information (for SW verify))
CPU(1).L1CACHE=32_KB                                    (CPU information (for SW verify))
CPU(1).L2CACHE=256_KB                                   (CPU information (for SW verify))
CPU(1).SMBIOSTYPE=11                                    (CPU information (for SW verify))
CPU(1).SMBIOSDESIGNATION=CPU1
MEM(1).DESC=128MB DIMM
MEM(1).OPERATION=CPL-KIT
MEM(1).BOM_PN=38L2818
MEM(1).TESTCLASS=memory
MEM(1).SPEED=60_NS                                      (Memory information (for SW verify))
MEM(1).SIZE=128_MB                                      (Memory information (for SW verify))
MEM(1).ECC=NO                                           (Memory information (for SW verify))
MEM(1).SMBIOSTYPE=3                                     (Memory information (for SW verify))
FDD(1).DESC=1.44MB FLOPPY
FDD(1).OPERATION=UNIT-ASM
FDD(1).BOM_PN=TSFD001
FDD(1).TESTCLASS=fdd
FDD(1).CAPACITY=1440_KB                                 (FDD information (for SW verify))
FDD(1).PICTURE( )=3
PICTURE(3).FILE=FLOPPY.JPG
PICTURE(3).DESC=FLOPPY DRIVE
IDE(2).DESC=20.4GB IDE HDD
IDE(2).OPERATION=KITTING
IDE(2).BOM_PN=09N0922
IDE(2).TESTCLASS=hdd_ide
IDE(2).CAPACITY=20.4_GB
CABLEIDE(1).SCHEMATIC( )=3
SCHEMATIC(3).DESC=IDE Cable
SCHEMATIC(3).FILE=IDECbl1.jpg
CONNECTORIDE(1).SCHEMATICOFFSET=empty
CABLEIDE(1).DESC=1 DROP IDE CABLE
CABLEIDE(1).OPERATION=KITT1NG
CABLEIDE(1).BOM_PN=33L3132
CABLEIDE(1).PICTURE( )=4
PICTURE(4).DESC=IDE Cable
PICTURE(4).FILE=IDECable.jpg
CABLEIDE(1).CONNECTORIDE( )=1
CABLEIDE(1).CONNECTORDEVICEFILLIDE=HDDIDE
CABLEIDE(1).CONNECTORFILLIDE=10
CABLEIDE(1).CONNECTORLOCIDE=NO
CONNECTORIDE(1).LOCATORTEXT=IDE 1
CONNECTORIDE(1).SETUPIDE=MASTER
CABLEIDE(2).SCHEMATIC( )=4
```

TABLE 5-continued

| | |
|---|---|
| SCHEMATIC(4).DESC=IDE Cable | |
| SCHEMATIC(4).FILE=IDECbl2.jpg | |
| CONNECTORIDE(2).SCHEMATICOFFSET=empty | |
| CONNECTORIDE(3).SCHEMATICOFFSET=empty | |
| CABLEIDE(2).DESC=2 DROP IDE CABLE | |
| CABLEIDE(2).OPERATION=KITTING | |
| CABLEIDE(2).BOM_PN=37L5001 | |
| CABLEIDE(2).PICTURE( )=5 | |
| PICTURE(5).DESC=IDE Cable | |
| PICTURE(5).FILE=IDECable.jpg | |
| CABLEIDE(2).CONNECTORIDE( )=2:3 | |
| CABLEIDE(2).CONNECTORDEVICEFILLIDE=HDDIDE,DVDIDE,CDIDE,TAPEIDE,ZIPIDE | |
| CABLEIDE(2).CONNECTORFILLIDE=30,40 | |
| CABLEIDE(2).CONNECTORLOCIDE=NO | |
| CONNECTORIDE(2).LOCATORTEXT=IDE 1 | |
| CONNECTORIDE(2).SETUPIDE=MASTER | |
| CONNECTORIDE(3).LOCATORTEXT=IDE 2 | |
| CONNECTORIDE(3).SETUPIDE=SLAVE | |
| PCI(2).DESC=LAKE CLARKE 2.4 ETHERNET CARD W AOL | |
| PCI(2).OPERATION=KITTING | |
| PCI(2).BOM_PN=34L1199 | |
| PCI(2).TESTCLASS=lake_clarke | |
| PCI(2).VENDORID=8086 | |
| PCI(2).DEVICEID=1229 | |
| PCI(2).PICTURE( )=6 | |
| PICTURE(6).DESC=LAKE CLARKE PCI ETHERNET CARD | |
| PICTURE(6).FILE=ether.jpg | |
| AGP(1).DESC=PCIVIDEO_S3AGP4X | |
| AGP(1).OPERATION=KITTING | |
| AGP(1).BOM_PN=09N1790 | |
| AGP(1).TESTCLASS=number9_4X | |
| AGP(1).VENDORID=5333 | |
| AGP(1).DEVICEID=8A22 | |
| AGP(1).VIDEOMEMORY=16_MB | |
| AGP(1).PICTURE( )=7 | |
| PICTURE(7).DESC=S3 AGP Video | |
| PICTURE(7).FILE=S3AGP2.jpg | |
| POWER(1).DESC=POWER SUPPLY | |
| POWER(1).OPERATION=UNIT-ASM | |
| POWER(1).BOM_PN=TSPS001 | |
| POWER(1).TESTCLASS=PowerSupply | |
| POWER(1).WATTAGE=145_WATTS | |
| POWER(1).CURRENT=20_AMPS | |
| POWER(1).VOLTAGE=115/220_VOLTS | |
| POWER(1).PICTURE( )=8 | |
| PICTURE(8).DESC=Power Supply | |
| PICTURE(8).FILE=Pwsup1.jpg | |
| CONNECTORPCI(3).INSTALLEDDEVICE=PCI(2) | (Indicates third pci connector gets second pci card) |
| PLANAR(1).SYSBIOSLANGUAGE=US | (Indicates desired BIOS language) |
| CONNECTORFDD(1).INSTALLEDDEVICE=FDD(1) | (Indicates first floppy drive is plugged on first floppy connector) |
| CONNECTORCPU(1).INSTALLEDDEVICE=CPU(1) | |
| CONNECTORMEM(1).INSTALLEDDEVICE=MEM(1) | |
| CONNECTORMEM(2).INSTALLEDDEVICE=EMPTY | |
| CONNECTORAGP(1).INSTALLEDDEVICE=AGP(1) | |
| CONNECTORPCI(1).INSTALLEDDEVICE=EMPTY | |
| CONNECTORPCI(2).INSTALLEDDEVICE=EMPTY | |
| CONNECTORCABLEIDE(1).INSTALLEDDEVICE=CABLEIDE(1) | |
| CONNECTORCABLEIDE(2).INSTALLEDDEVICE=CABLEIDE(2) | |
| CONNECTORCABLEFDD(1).INSTALLEDDEVICE=CABLEFDD(1) | |
| CONNECTORPOWER(1).INSTALLEDDEVICE=POWER(1) | |
| CONNECTORIDE(1).INSTALLEDDEVICE=IDE(2) | |
| CONNECTORIDE(2).INSTALLEDDEVICE=IDE(1) | |
| CONNECTORIDE(3).INSTALLEDDEVICE=EMPTY | |
| BAYPLANAR(1).LOCATEDDEVICE=PLANAR(1) | (Planar(1) is mounted in BayPlanar(1)) |
| BAYPOWER(1).LOCATEDDEVICE=POWER(1) | (Power(1) power supply is mounted in BayPower(1)) |
| BAYFDD(1).LOCATEDDEVICE=FDD(1) | |
| BAYHDD(1).LOCATEDDEVICE=IDE(2) | |
| BAYDASD1(1).LOCATEDDEVICE=IDE(1) | |
| BAYDASD2(1).LOCATEDDEVICE=EMPTY | |
| Dynamic AOD Modification | |

A key benefit of the AOD data model is that different processes in the fulfillment system can add to or alter the AOD stream. Thus, as the customer selects certain devices and options, the system can automatically generate AOD corresponding to proper configuration and population rules. That information need not be provided at the time of order entry, but rather is determined later during a post-order process that is transparent to the customer.

FIG. 1 illustrates a product fulfillment system 10 in accordance with one embodiment of the present invention. As is shown, a web based front end ordering system 20 allows the customer to select from a wide range of configuration options. The ordering system may capture part numbers requested and a small amount of personalization data, such as which PCI slots a customer wants the cards installed in, and some network settings. The personalization data is referred to as Customer AOD. The information obtained through the user interface is then passed into a Order Processing System 30.

Here, the customer's product specifications are merged with population and configuration rules to form an AOD data stream. Configuration and population rules are stored in a database along with tables that associate part numbers to AOD; the part numbers have a one to one correspondence with components, and define the objects, attributes and values. Because the Order Processing System 30 has the ability to capture and convert the customer's specifications and supplement that information to create an operable computer, the amount of information required from the customer is minimized.

The AOD data stream emerging from the Order Processing System 30 is referred to as the Process AOD 40. This AOD fully and accurately describes the customized product requested by the customer. The Process AOD 40 is used in the automated manufacturing system 50, which includes several processes. For example, the automated manufacturing system 50 can include processes for creating assembly instructions 52, a process for automated testing 54, a process for automatically loading software 56, a customization process 58, and quality control 60. In addition, a service and support process 62 can be incorporated into the system 50.

In a preferred embodiment, the automated manufacturing system's 50 processes can be software based. Each process understands and works off of the Process AOD 40. Because each of the processes 52–62 is specialized, the entire Process AOD 40 need not be transferred to each of the processes 52–62. A particular process, for example, the automated test process 54, can examine the Process AOD 40 and extract only those portions that are relevant to the test process 54 function. Accordingly, the amount of data transfer through the automated manufacturing system 50 is minimized.

Figure 2:
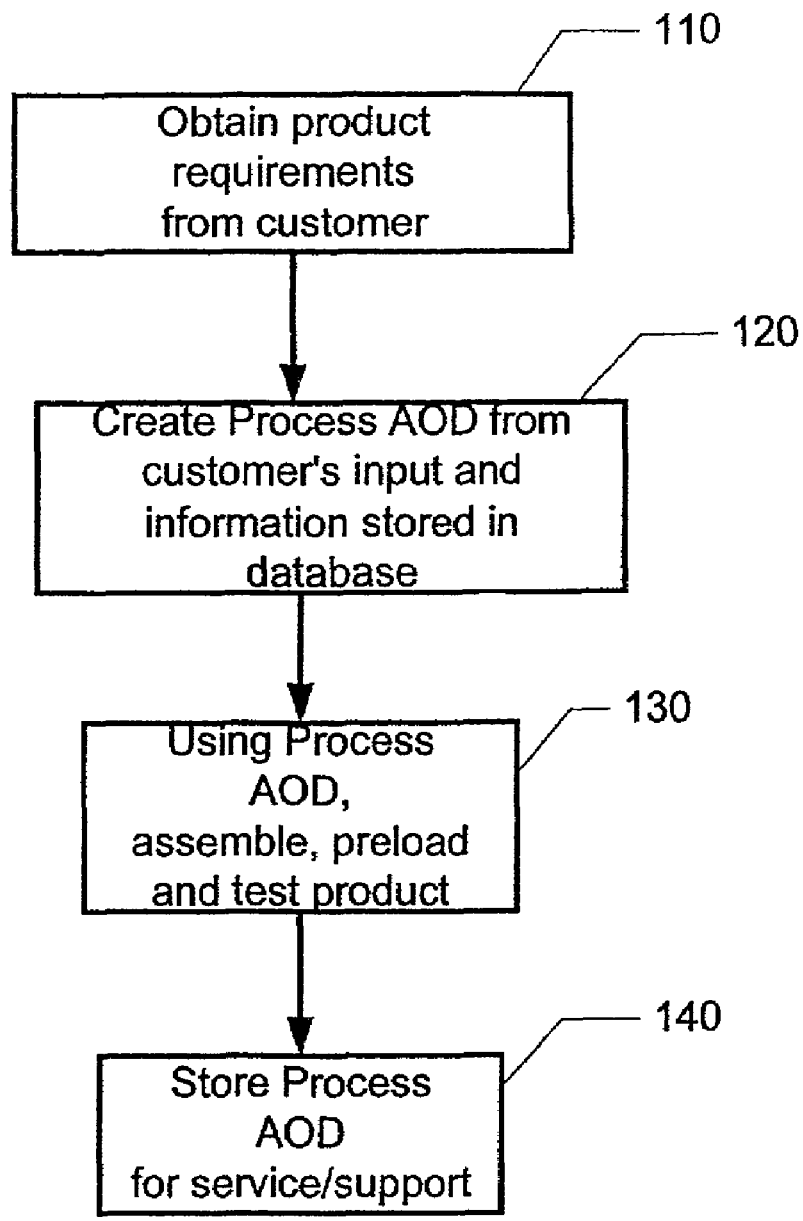
FIG. 2 illustrates the product fulfillment process according to the present invention.

In another embodiment, the assembly instructions process 52 uses the Process AOD 40 to create a pictorial form of the assembled product. For instance, instead of interpreting written assembly instructions, the assembly worker can be presented with a pictorial view of the device. This view can illustrate what particular components should be installed, how components should be connected, and where, i.e. which slot, a component should be placed. By presenting a picture of the assembled product, language barriers can be overcome, and worker confusion can be FIG. 2 is a flow diagram of a product fulfillment process 100 according to the present invention. In step 110, the process begins by obtaining the requirements, including configuration and personalized data, from the customer. This information is then used to create the Process AOD, via step 120. Step 120 is preferably an automated process which merges the information obtained from the customer with information stored in the database relating to configuration rules and population schemes. After the Process AOD is generated, it is used by the automated manufacturing system where the product is assembled, preloaded with software, and tested, via step 130. Finally, in step 140, the Process AOD is stored in a database for use by the service and support department to restore, repair, or replace hardware in the computer (e.g., correct BIOS levels, network settings, etc.).

The object oriented approach and data model according to the present invention provides the ability to capture customer inputs from an ordering system and to transmit them to the manufacturing process without manual intervention or retyping of a free form, text based, order. It allows customers to specify a wide range of requested configuration options at order entry time to satisfy the customer's requirements. The present invention captures the order information accurately and completely, eliminating the need for follow-up calls with the customer to ask additional questions or for clarifications.

The Process AOD provides a structured data format that can be used by all processes including ordering systems, manufacturing, assembly, manufacturing test, preload, quality, and service/support. Because of the modular nature of AOD, new products and components can easy be added to the system. Thus, rather than having to create and release a new model to specify new groupings of hardware, software, or other options, the object oriented data model allows a modular, building block approach. Finally, because customization and personalization data can be accurately captured without requiring separate part numbers, the number of part numbers that must be released by a development team is reduced.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for product fulfillment in an automated manufacturing system, the method comprising the steps of:
   a) obtaining requirements for a product from a customer;
   b) creating a manufacturing plan from the requirements using a descriptive language, wherein the automated manufacturing system is capable of interpreting the descriptive language; and
   c) conveying the manufacturing plan to the automated manufacturing system, wherein the automated manufacturing system interprets the manufacturing plan and builds the product satisfying the requirements.

2. The method of claim 1, wherein the descriptive language is hierarchical and object oriented.

3. The method of claim 2, wherein the descriptive language describes the product by a plurality of objects, each object of the plurality of objects having an attribute, and the attribute being assigned a value.

4. The method of claim 3, wherein each object identifies a component in the product, wherein the component can be either a physical part or a logical part.

5. The method of claim 4, wherein the descriptive language is capable of describing a hierarchical relationship between objects.

6. The method of claim 5, wherein the descriptive language is capable of describing a mechanical and electrical connection between objects.

7. The method of claim 1, wherein the plan integrates the requirements with population rules that determine a sequence for manufacturing the product, and configuration rules that determine proper configuration settings.

8. The method of claim 1, wherein the automated manufacturing system includes a plurality of processes that use the plan to produce the product, the plurality of processes being software based.

9. The method of claim 8, wherein the conveying step c) further comprises the step of:
   c1) providing a portion of the plan to a process of the plurality of processes, the portion being relevant to the process, thereby reducing the amount of information conveyed throughout the automated manufacturing system.

10. The method of claim 8, wherein one process of the plurality of processes is an assembly process, the assembly process including the step of generating assembly instructions from the plan.

11. The method of claim 10, wherein the assembly instructions are provided in a pictorial form such that an assembly worker can view the product assembled.

12. The method of claim 1, wherein obtaining step (a) further includes the step of entering the requirements through a user interface, the user interface being a web based front end ordering system.

13. The method of claim 1, wherein the plan is created automatically.

14. The method of claim 1 further comprising the step of (e) storing the plan for future repairs and maintenance.

15. A method for product fulfillment in a configure-to-order automated manufacturing system, the method comprising the steps of:
   a) obtaining requirements for a product from a customer through a user interface;
   b) creating a manufacturing plan from the requirements using a descriptive language, wherein the automated manufacturing system is capable of interpreting the descriptive language and the descriptive language is hierarchical and object oriented; and
   c) conveying the manufacturing plan to the automated manufacturing system, wherein the automated manufacturing system interprets the manufacturing plan and builds the product satisfying the requirements.

16. The method of claim 15, wherein the descriptive language describes the product by a plurality of objects, each object of the plurality of objects having an attribute, and the attribute being assigned a value.

17. The method of claim 16, wherein each object identifies a component in the product, wherein the component can be either a physical part or a logical part.

18. The method of claim 17, wherein the descriptive language is capable of describing a hierarchical relationship between objects.

19. The method of claim 18, wherein the descriptive language is capable of describing a mechanical and electrical connection between objects.

20. The method of claim 15, wherein the automated manufacturing system includes a plurality of processes that use the plan to produce the product, the plurality of processes being software based.

21. The method of claim 20, wherein the conveying step c) further comprises the step of:
   c1) providing a portion of the plan to a process of the plurality of processes, the portion being relevant to the process, thereby reducing the amount of information conveyed throughout the automated manufacturing system.

22. The method of claim 15, wherein obtaining step (a) further includes the step of entering the requirements through a user interface, the user interface being a web based front end ordering system.

23. The method of claim 15 further comprising the step of (e) storing the plan for future repairs and maintenance.

24. A method for product fulfillment in a configure-to-order computer manufacturing system, the method comprising the steps of:
   a) obtaining requirements for a computer product from a customer through a user interface;
   b) automatically creating a manufacturing plan from the requirements using a descriptive language, wherein the automated manufacturing system is capable of interpreting the descriptive language; and
   c) conveying the manufacturing plan to the automated manufacturing system, wherein the automated manufacturing system interprets the manufacturing plan and builds the computer product satisfying the requirements.

25. The method of claim 24, wherein the descriptive language is hierarchical and object oriented.

26. The method of claim 25, wherein the descriptive language describes the computer by a plurality of objects, each object of the plurality of objects having an attribute, and the attribute being assigned a value.

27. The method of claim 26, wherein each object identifies a component in the customized computer, wherein the component can be either a physical part or a logical part.

28. The method of claim 24, wherein requirements include hardware parts, software parts, service parts, and personalized data.

29. The method of claim 28, wherein the personalized data includes an IP address, a computer name, and slot preferences.

30. The method of claim 29, wherein the obtaining step (a) further includes the steps of:
   a1) entering a plurality of part numbers, each part number corresponding to a hardware part, a software part, or a service part; and
   a2) entering the personalized data.

31. The method of claim 30, wherein the plurality of part numbers and personalized data is automatically converted into the descriptive language to form the plan.

32. The method of claim 31, wherein the automated manufacturing system includes a plurality of processes that use the plan to produce the computer product, the plurality of processes being software based.

33. The method of claim 32, wherein one process of the plurality of processes is an assembly process, the assembly process including the step of generating assembly instructions from the plan.

34. The method of claim 33, wherein the assembly instructions are provided in a pictorial form such that an assembly worker can view the computer product assembled, including the slot preferences for the hardware parts.

35. The method of claim 24, wherein the user interface is a web based front end ordering system.

36. The method of claim 24 further comprising the step of (e) storing the plan for future repairs and maintenance.

37. A configure-to-order automated manufacturing system, comprising:

a user interface for obtaining requirements for a product from a customer;

an order processing system for automatically creating a manufacturing plan from the requirements using a descriptive language, wherein the automated manufacturing system is capable of interpreting the descriptive language; and a plurality of processes for manufacturing the product from the manufacturing plan.

38. The system of claim 37, wherein the descriptive language is hierarchical and object oriented.

39. The system of claim 38, wherein the descriptive language describes the product by a plurality of objects, each object of the plurality of objects having an attribute, and the attribute being assigned a value.

40. The system of claim 39, wherein each object identifies a component in the product, and wherein the component can be either a physical part or a logical part.

41. The system of claim 40, wherein the descriptive language is capable of describing a hierarchical relationship between objects.

42. The system of claim 41, wherein the descriptive language is capable of describing a mechanical and electrical connection between objects.

43. The system of claim 37, wherein each process of the plurality of processes is provided a portion of the plan, the portion being relevant to the process, thereby reducing the amount of data conveyed throughout the manufacturing system.

44. The system of claim 43, wherein one process of the plurality of processes is an assembly process that generates assembly instructions from the plan.

45. The system of claim 44, wherein the assembly instructions are provided in a pictorial form such that an assembly worker can view the product assembled.

46. The system of claim 37, wherein the user interface is a web based front end ordering system.

47. The system of claim 37 further comprising a database for storing the plan for future repairs and maintenance.

48. A computer readable medium containing program instructions for product fulfillment in a configure-to-order automated manufacturing system, the program instructions for:
 a) obtaining requirements for a product from a customer through a user interface;
 b) creating a manufacturing plan from the requirements using a descriptive language, wherein the automated manufacturing system is capable of interpreting the descriptive language;
 c) conveying the manufacturing plan to the automated manufacturing system, wherein the automated manufacturing system interprets the manufacturing plan and builds the product satisfying the requirements; and
 (e) storing the manufacturing plan for future repairs and maintenance.

49. The computer readable medium of claim 48, wherein the descriptive language is hierarchical and object oriented, and describes the product by a plurality of objects, each object of the plurality of objects having an attribute, and the attribute being assigned a value.

50. The computer readable medium of claim 49, wherein each object identifies a component in the product, and wherein the component can be either a physical part or a logical part.

51. The computer readable medium of claim 48, wherein the automated manufacturing system includes a plurality of processes that use the plan to produce the product, the plurality of processes being software based.

52. The computer readable medium of claim 51, wherein the conveying instruction (c) further comprises the instruction of:
 c1) providing a portion of the plan to each process of the plurality of processes, the portion being relevant to the process, thereby reducing the amount of information conveyed throughout the automated manufacturing system.

53. The computer readable medium of claim 51, wherein one process of the plurality of processes is an assembly process, the assembly process including the instruction of generating assembly instructions from the plan.

54. The computer readable medium of claim 53, wherein the assembly instructions are provided in a pictorial form such that an assembly worker can view the product assembled.

55. A method for describing a product for manufacture, comprising the steps of:
 a) providing a descriptive language, wherein an automated manufacturing system is capable of interpreting the descriptive language and the descriptive language is hierarchical and object oriented; and
 b) using the descriptive language to create a manufacturing plan that describes the product.

56. The method of claim 55, wherein the descriptive language describes the product by a plurality of objects, each object of the plurality of objects having an attribute, and the attribute being assigned a value.

57. The method of claim 56, wherein each object identifies a component in the product, wherein the component can be either a physical part or a logical part.

58. The method of claim 57, wherein the descriptive language is capable of describing a hierarchical relationship between objects.

59. The method of claim 58, wherein the descriptive language is capable of describing a mechanical and electrical connection between objects.

* * * * *